US012646052B2

(12) United States Patent
Jester et al.

(10) Patent No.: US 12,646,052 B2
(45) Date of Patent: Jun. 2, 2026

(54) LOCALIZED CURRENCY EXCHANGE AND PAYMENT

(71) Applicant: Toshiba Global Commerce Solutions Holdings Corporation, Tokyo (JP)

(72) Inventors: Richard J. Jester, Clayton, NC (US); Jonathan E. Simmons, Morrisville, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 522 days.

(21) Appl. No.: 17/814,690

(22) Filed: Jul. 25, 2022

(65) Prior Publication Data

US 2024/0029058 A1     Jan. 25, 2024

(51) Int. Cl.
| | |
|---|---|
| *G06Q 40/00* | (2023.01) |
| *G06Q 20/20* | (2012.01) |
| *G06Q 20/38* | (2012.01) |
| *G06Q 40/04* | (2012.01) |

(52) U.S. Cl.
CPC ......... *G06Q 20/381* (2013.01); *G06Q 20/201* (2013.01)

(58) Field of Classification Search
CPC ........................... G06Q 20/381; G06Q 20/201
See application file for complete search history.

(56) References Cited

U.S. PATENT DOCUMENTS

| | | | | |
|---|---|---|---|---|
| 2002/0174031 A1* | 11/2002 | Weiss | ..................... | G06Q 20/04 |
| | | | | 705/26.1 |
| 2002/0179401 A1* | 12/2002 | Knox | ..................... | G06Q 20/28 |
| | | | | 194/217 |
| 2004/0164145 A1* | 8/2004 | Licciardello | .......... | G07F 19/203 |
| | | | | 235/381 |
| 2011/0238549 A1* | 9/2011 | Poon | ..................... | G06Q 40/00 |
| | | | | 705/35 |
| 2013/0018738 A1* | 1/2013 | Faires | .................. | G06Q 20/381 |
| | | | | 705/16 |
| 2016/0012465 A1* | 1/2016 | Sharp | ................... | G06Q 20/321 |
| | | | | 705/14.17 |
| 2018/0101898 A1* | 4/2018 | Poon | ..................... | G06Q 40/00 |
| 2022/0067702 A1* | 3/2022 | Dunjic | .............. | G06Q 20/3433 |

* cited by examiner

*Primary Examiner* — Talia F Crawley
(74) *Attorney, Agent, or Firm* — Patterson + Sheridan, LLP; Gero G. McClellan

(57) ABSTRACT

Techniques are provided for localized currency exchange and payment. In one embodiment, the techniques involve a sales system that determines a cost of an item for purchase, displays a foreign currency payment option, receives a selection of a first foreign currency, retrieves a first exchange rate corresponding to the first foreign currency, receives a first foreign currency amount comprising at least one of notes or coins, converts the first foreign currency amount to a first local currency amount based on the first exchange rate, and displays a difference amount between the first local currency amount and the cost of the item.

19 Claims, 4 Drawing Sheets

LOCALIZED CURRENCY EXCHANGE AND PAYMENT

BACKGROUND

The present disclosure relates to currency exchange and payments, and more specifically, to accepting foreign currencies as payment for costs denominated in a local currency.

DETAILED DESCRIPTION

Figure 1A:
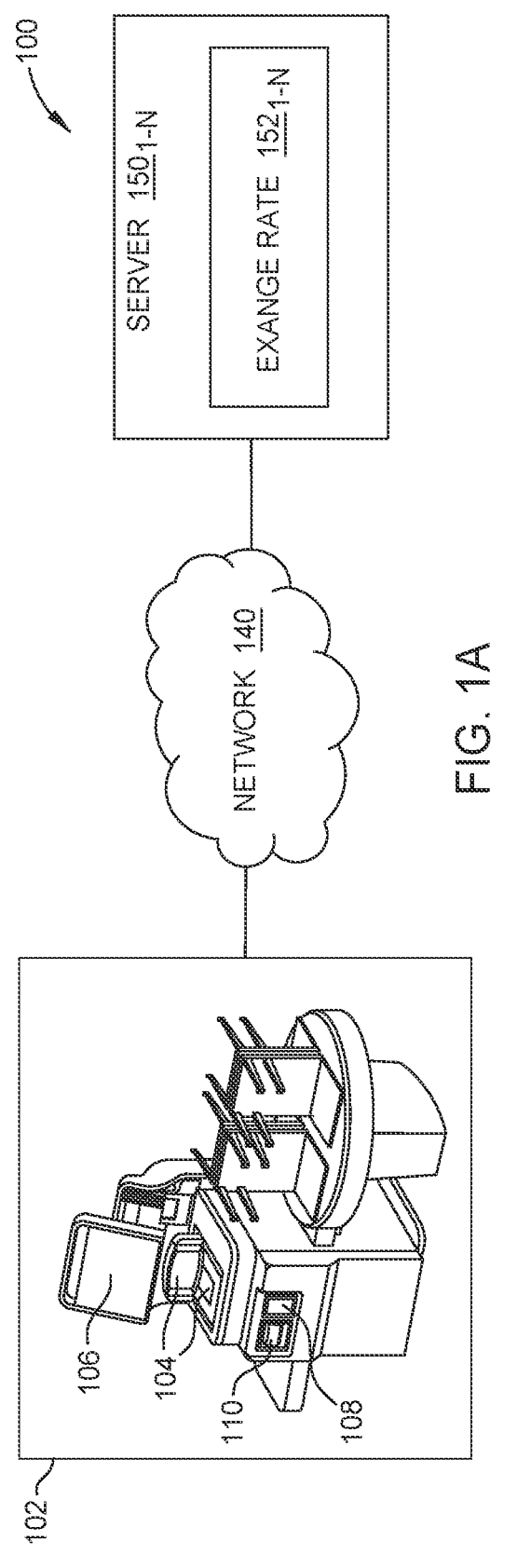
FIG. 1A illustrates a currency exchange and payment environment, according to one embodiment.

Traditional payment systems can accept a local currency to complete a transaction. However, these payment systems are unable to utilize foreign fiat currencies to complete the transactions.

Embodiments of the present disclosure improve upon sales systems (such as point of sales devices and kiosks) by implementing payment software and money flow systems to include additional functionality concerning foreign, physical currencies. Such additional functionality includes, for example, the sales systems performing real-time currency conversions/exchanges, and completing transactions involving foreign bills and coins. In some embodiments, an end user can select at least one foreign currency, or a combination of at least one foreign currency and a local currency, at a sales system to complete a transaction denominated in the local currency.

A method is provided according to one embodiment of the present disclosure. The method includes determining, via a sales system, a cost of an item for purchase; displaying, via the sales system, a foreign currency payment option; receiving, via the sales system, a selection of a first foreign currency; retrieving, via the sales system, a first exchange rate corresponding to the first foreign currency; receiving, via a money flow system, a first foreign currency amount that includes at least one of notes or coins; converting, via the sales system, the first foreign currency amount to a first local currency amount based on the first exchange rate; and displaying, via the sales system, a difference amount between the first local currency amount and the cost of the item.

A point of sale device is provided according to one embodiment of the present disclosure. The point of sale device includes a display; a money flow system; a network interface; a processor; and memory that includes an algorithm or computer instruction, which when executed by the processor, performs an operation, the operation includes: determining a cost of an item for purchase; displaying, via the display, a foreign currency payment option; receiving a selection of a first foreign currency; retrieving, via the network interface, a first exchange rate corresponding to the first foreign currency; receiving, via the money flow system, a first foreign currency amount; converting the first foreign currency amount to a first local currency amount based on the first exchange rate; and displaying, via the display, a difference amount between the first local currency amount and the cost of the item.

A computer-readable storage medium having computer-readable program code embodied therewith, the computer-readable program code executable by one or more computer processors to perform an operation, is provided according to one embodiment of the present disclosure. The operation includes determining a cost of an item for purchase; outputting for display a foreign currency payment option; receiving a selection of a first foreign currency; retrieving a first exchange rate corresponding to the first foreign currency; tracking a first foreign currency amount received at a money flow system; converting the first foreign currency amount to a first local currency amount based on the first exchange rate; and outputting for display a difference amount between the first local currency amount and the cost of the item.

One benefit of the disclosed embodiments is to allow for an increase in local transactions by users who hold foreign currencies. Further, embodiments of the present disclosure provide a single transaction point that allows users to aggregate the value of their held foreign currencies, and to supplement this value with a local currency, to complete transactions, despite the value of any individual held currency being insufficient to complete the transactions.

FIG. 1A illustrates a currency exchange and payment environment 100, according to one embodiment. In the illustrated embodiment, the currency exchange and payment environment 100 includes a sales system 102 communicatively coupled to a money flow system 110 and at least one server $150_{1\text{-}N}$.

In one embodiment, the sales system 102 includes a processor that obtains instructions and data via a bus from memory or storage. Not all components of the sales system 102 are shown. The sales system 102 is generally under the control of an operating system (OS) suitable to perform or support the functions or processes disclosed herein. The processor is a programmable logic device that performs instruction, logic, and mathematical processing, and may be representative of one or more CPUs. The processor may execute one or more algorithms, instruction sets, or software applications in the memory or storage to perform the functions or processes described herein.

The memory and storage can be representative of hard-disk drives, solid state drives, flash memory devices, optical media, and the like. The storage may also include structured storage, for example a database. In addition, the memory and the storage may be considered to include memory physically located elsewhere; for example, on another computer communicatively coupled to the sales system 102 via the bus or network 140.

The sales system 102 may also include one or more network interface devices connected to the bus. The network interface devices may be any type of network communications device allowing the computer to communicate with other computers via the network 140. The network interface devices may exchange data with at least one server $150_{1\text{-}N}$ via the network 140. In one embodiment, the exchanged data includes at least one exchange rate $152_{1\text{-}N}$ for foreign currency and local currency pairs.

The sales system 102 further includes a display 106 communicatively coupled to the bus or the network 140. The display 106 can be used to show a graphical user interface (GUI) that facilitates a transaction involving at least one foreign currency. In one embodiment, the display 106 includes a touchscreen that can be used to enter an item identifier, thereby inputting a corresponding item into the transaction. The sales system 102 may also include a scanner 104 to scan barcodes, or other item identifiers, to input corresponding items into the transaction. In one embodiment, the sale system 102 is a kiosk or point of sale (PoS) device at a store that is used to purchase items (e.g., clothes, food, home improvement items, and the like). Further, in one embodiment, the sale system 102 is a PoS device in a self-checkout lane where a customer scans the items for purchase rather than a store employee.

In one embodiment, the sales system 102 calculates the cost of the items in the transaction, and shows the cost on the display 106. The sales system 102 can offer the end user multiple payment options, including a foreign currency payment option, via the display 106. When the foreign currency payment option is selected, the sales system 102 can show which foreign currencies are accepted for the transaction on the display 106. Further, the sales system 102 can retrieve pertinent exchange rates from the server $150_{1-N}$ via the network 140, and show the exchange rates on the display 106. This process is described in further detail in FIGS. 2A-2B.

The end user can input foreign currency notes or coins into the money flow system 110, and confirm use of the exchange rates to complete the transaction. Upon receiving this confirmation, the sales system 102 uses the exchange rates to convert the foreign currencies to a local currency, and subtracts the costs of the items in the transaction (which are denominated in the local currency) from the value of the converted currencies and any inputted local currency. When necessary, the sales system 102 can notify the end user of insufficient funds to complete the transaction via the display 106 or an audible announcement. When there are sufficient funds, the transaction is completed, and any change due (denominated in the local currency) can be returned to the end user via the money flow system 110 or a coin dispenser 108.

Figure 1B:
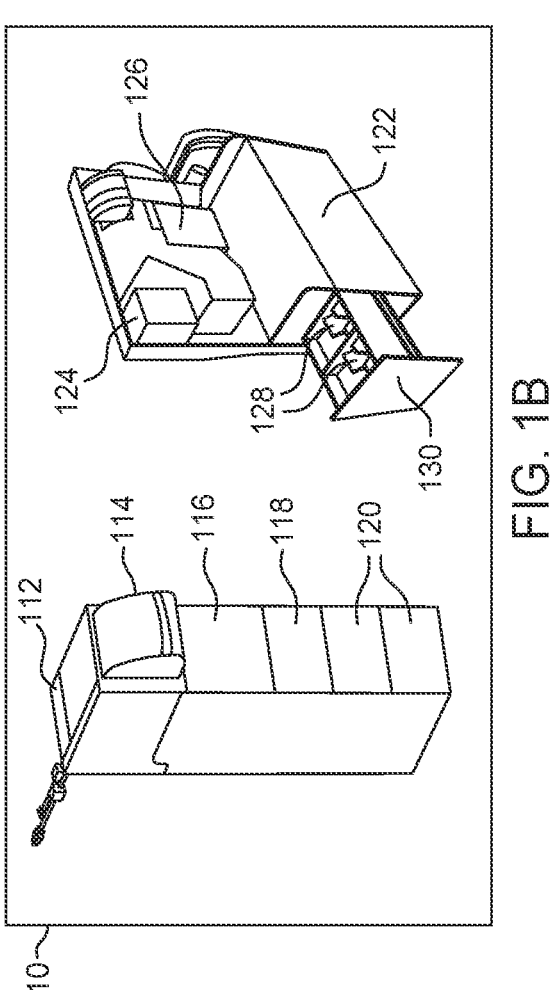
FIG. 1B illustrates money flow systems, according to one embodiment.

FIG. 1B illustrates a money flow system, according to one embodiment. The money flow system 110 can include a bank note recycler (BNR) 112 or a bulk coin recycler (BCR) 122.

In one embodiment, the BNR 112 includes a bill transfer module 114, a cash box module 116, a loader module 118, and recycler modules 120. The BNR 112 includes at least one processor that executes at least one algorithm, instruction set, or software application to perform the functions or processes described herein.

The bill transfer module 114 can accept and return bills. This module includes a scanner that scans inputted bills, and validation software to determine the authenticity and the governing entity of the inputted bills. In one embodiment, the validation software is a set of computer instructions or algorithms executed by the processor. The cash box module 116 stores bills from completed transactions. The loader module 118 contains bills denominated in the local currency. These bills are validated via the validation software, and provided to the recycler modules 120, which can transfer the bills to and from the bill transfer module 114.

Local or foreign bills can be input into the bill transfer module 114 to pay for a transaction. Any inputted bills that the validator software determines to be inauthentic or issued by a non-accepted governing entity (as selected by a system administrator implementing the BNR 112) can be output from the BNR 112 via the bill transfer module 114. As a non-limiting example, in one embodiment, the sales system 102 may only accept Canadian dollars, the U.S. dollar, and the Mexican Peso. Any other currency that is input into the BNR 112 will be subsequently output by the BNR 112 via the bill transfer module 114. Authentic and accepted bills can be temporarily stored in the bill transfer module 114 pending completion of the transaction. Upon any cancellation of the transaction the bills are returned from the bill transfer module 114.

While the transaction is pending, the BNR 112 can communicate the value of the inputted bills to the sales system 102. As previously discussed, the sales system 102 can determine whether there are sufficient funds to complete the transaction, and calculate any change due (denominated in the local currency). After receiving confirmation that the transaction is complete, and calculating any change due, the BNR 112 can transfer any inputted foreign currency bills to the cash box module 116. Further, the BNR 112 can use local currency bills from the recycler modules 120 and the bill transfer module 114 to return the change due in bills to end user. Any coins from the change due can be returned via the coin dispenser 108 of the sales system 102. Upon returning the change due, the remaining local currency in the bill transfer module 114 may be transferred to the cash box module 116, or to the recycler modules 120.

In one embodiment, the BCR 122 includes a coin transfer module 124, a coin validator module 126, a coin box module (not shown), coin hopper modules 128, and a hopper tray door 130. The BCR 122 includes at least one processor that executes at least one algorithm, instruction set, or software application to perform the functions or processes described herein.

The coin transfer module 124 can accept and return coins. The coin validator module 126 includes a scanner that scans inputted coins, and can determine the authenticity and the governing entity of the inputted coins using algorithms or computer instructions executed by the processor. The coin box module stores coins from completed transactions. The coin hoppers modules 128 can transfer coins to and from the coin transfer module 124. The hopper tray door 130 can be used to access the coin hopper modules 128 for coin resupply.

Local or foreign coins can be input into the coin transfer module 124 to pay for a transaction. Any inputted coins that the coin validator module 126 determines to be inauthentic or issued by a non-accepted governing entity (as selected by a system administrator implementing the BCR 122) can be returned via the coin transfer module 124. Authentic and accepted coins can be temporarily stored in the coin transfer module 124 pending completion of the transaction. Upon any cancellation of the transaction the coins can be returned from the coin transfer module 124, or the coin dispenser 108 of the sales system 102.

While the transaction is pending, the BCR 122 can communicate the value of the inputted coins to the sales system 102. As previously discussed, the sales system 102 can determine whether there are sufficient funds to complete the transaction, and calculate any change due (denominated in the local currency). After receiving confirmation that the transaction is complete, and calculating any change due, the BCR 122 can transfer any foreign currency coins to the coin box module. Further, the BCR 122 can use local currency coins from the coin hopper modules 128 and the coin transfer module 124 to return the change to in coins to end user. Any change due can be returned via coin transfer module 124 or the coin dispenser 108 of the sales system

102. Upon returning the change due, the remaining local currency in the coin transfer module 124 may be transferred to the coin box module, or to the coin hopper modules 128.

In one embodiment, the BNR 112 and the BCR 122 operate concurrently to accept local or foreign currency bills or coins (or a combination of local and foreign currency bills or coins), and return change due in the local currency bills and coins, according to the processes described above. In another embodiment, the BNR 112 and BCR 122 are integrated into a single recycler system. In yet another embodiment, either the BNR 112 or the BCR 122 is the sole recycler of the money flow system 110.

Figure 2A:
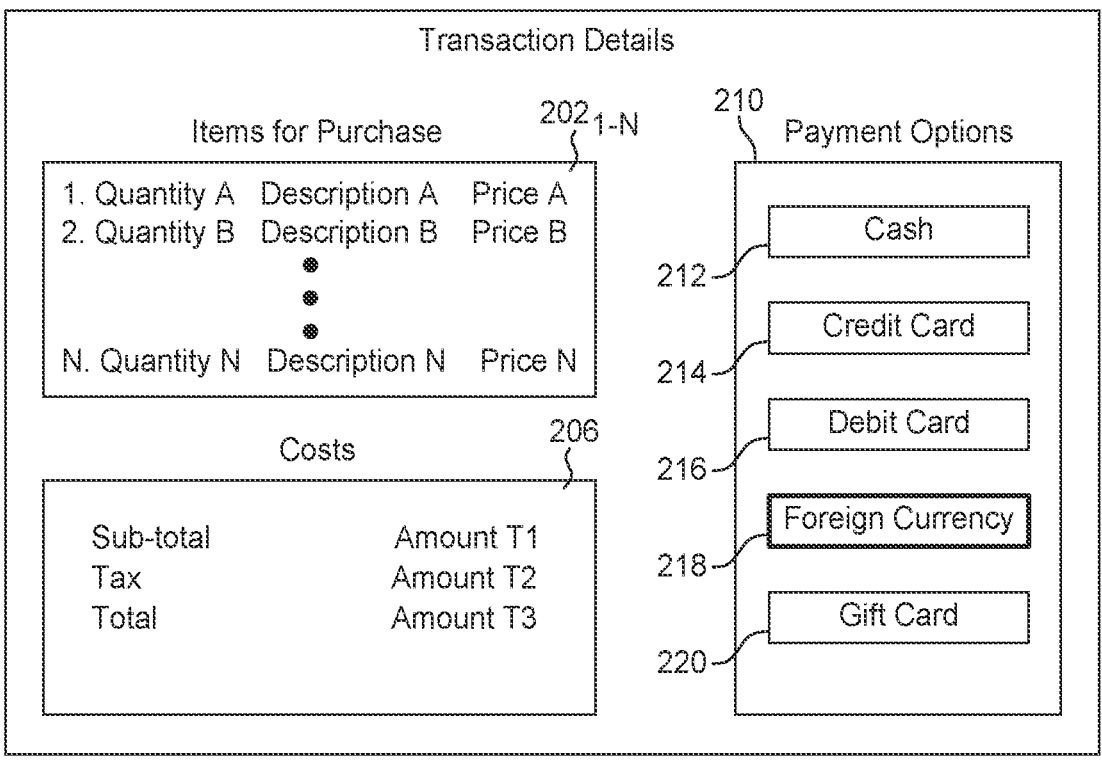
FIG. 2A illustrates a graphical user interface for a sales system, according to one embodiment.
Figure 2B:
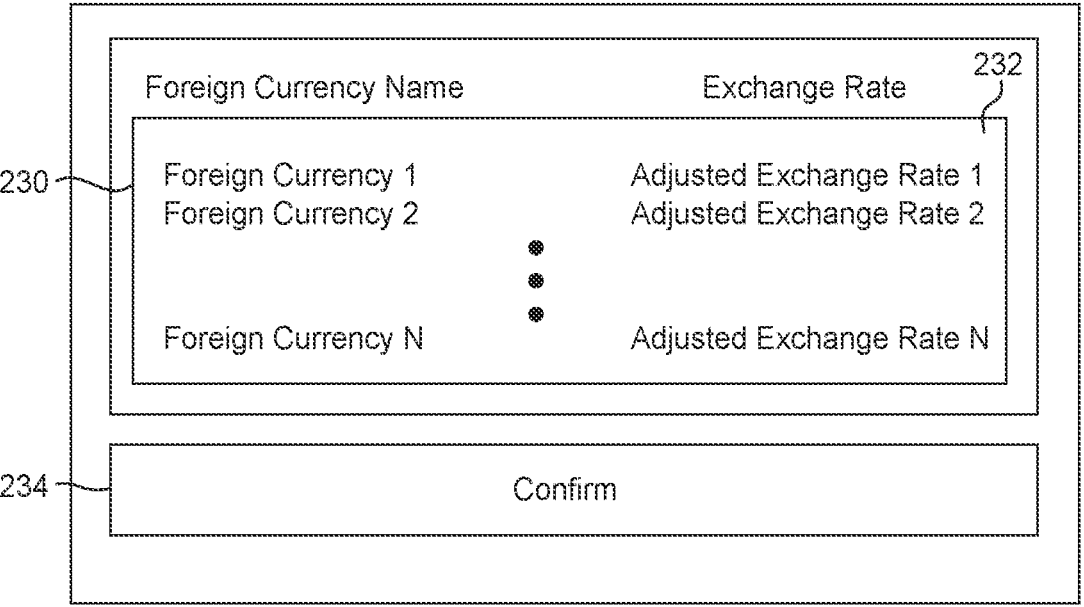
FIG. 2B illustrates a graphical user interface for a sales system, according to one embodiment.
Figure 3:
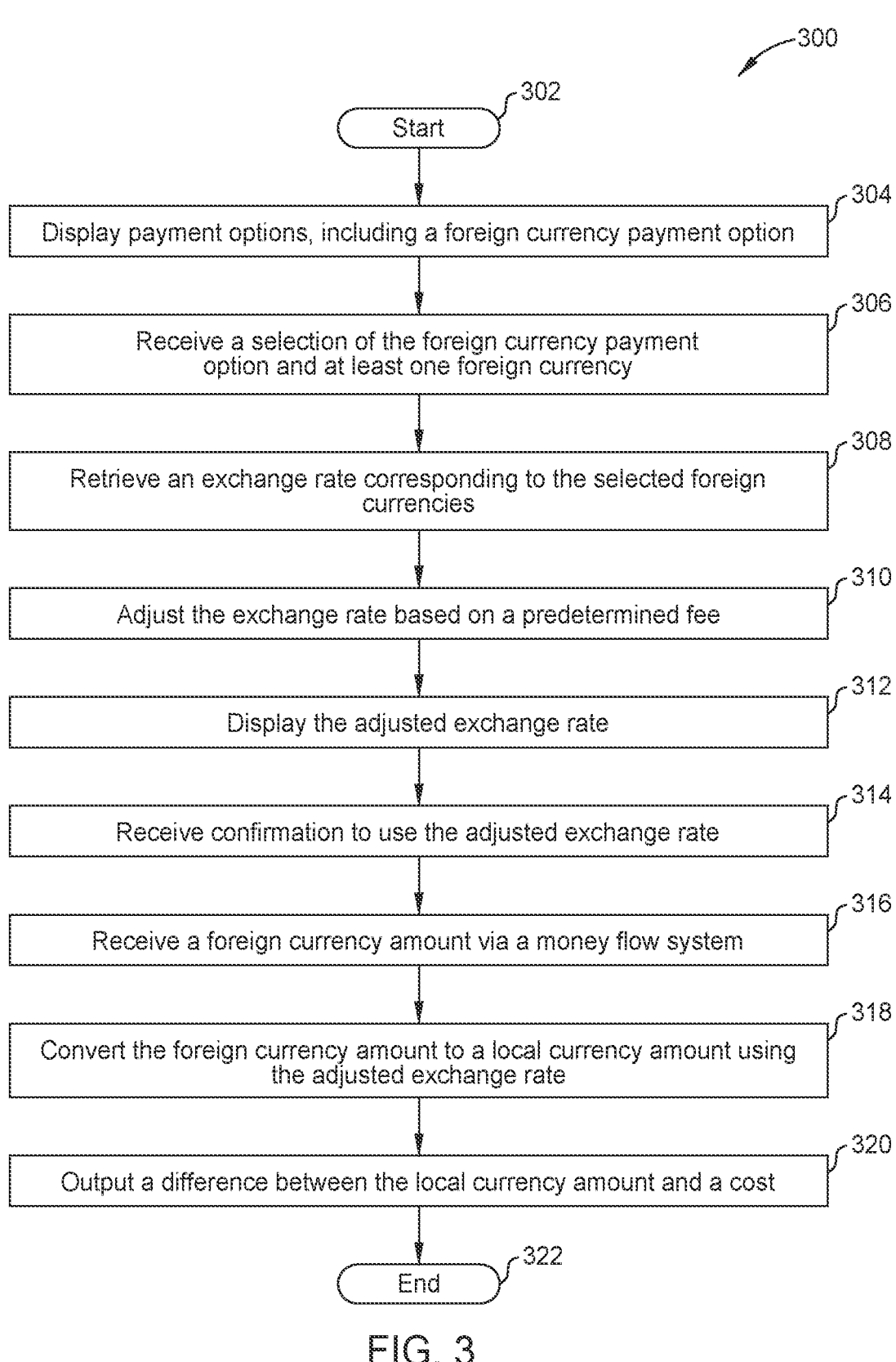
FIG. 3 illustrates a flowchart of a method for operating a software application, according to one embodiment.

FIG. 2A illustrates a graphical user interface of a sales system, according to one embodiment. FIG. 2B illustrates a graphical user interface of a sales system, according to one embodiment. FIG. 3 illustrates a flowchart of a method for operating a software application, according to one embodiment. FIGS. 2A and 2B are explained in conjunction with FIG. 3.

As mentioned above, an end user of the sales system 102 can use the scanner 104 to scan item identifiers, or use the display 106 to enter item identifiers, to input corresponding items into a transaction. The display 106 can be used to show a graphical user interface (GUI) that facilitates a transaction involving at least one foreign currency.

FIG. 2A depicts an example GUI of a software application for the sales system 102, which can be shown on the display 106 after items have been scanned into the transaction. A method for operating the software application begins at block 302.

At block 304, the sales system 102 displays payment options 210, including a foreign currency payment option 218. As shown in FIG. 2A, transaction details shown in the GUI include a list of items for purchase 2021-N, a list of costs for the items 206, and payment options 210.

In one embodiment, list of items for purchase 2021-N includes quantities, descriptions, and prices of the items. The list of costs for the items 206 can include a sub-total, taxes due, and a total amount of the transactions, which are calculated by the sales system 102, and shown on the display 106. The payment options 210 can include options for payment via cash (bills denominated in the local currency) 212, credit card 214, debit card 216, foreign currency 218, gift card 220, and the like.

At block 306, the sales system 102 receives a selection of the foreign currency payment option 218 and at least one foreign currency. When the foreign currency payment option 218 is selected, the GUI can show selectable options for foreign currencies that can be accepted by the sales system 102 on the display 106. The foreign currencies that are deemed acceptable can be configured by an administrator of the sales system 102. In one embodiment, the GUI can provide a drop-down menu, new screen, overlay, or pop-up (or the like) of acceptable foreign currencies on the display 106 for the end user to select. The end user can select one or more of the acceptable foreign currencies to proceed with the transaction.

At block 308, the sales system 102 retrieves an exchange rate corresponding to the selected foreign currencies. As shown in FIG. 2B, the GUI can provide a list of the selected foreign currencies 230 on the display 106. Although FIG. 2B depicts a new screen of the GUI, this information can also be provided via a drop-down menu, overlay, pop-up, or the like.

Further, the sales system 102 can request an exchange rate for each foreign currency in the list of selected foreign currencies 230 versus the local currency. The request is sent to at least one server $150_{1-N}$ via the network 140. In one embodiment, the servers $150_{1-N}$ include real-time exchange rates $152_{1-N}$ as determined by at least one bank or financial institution. In response to the request, the servers $150_{1-N}$ return pertinent exchange rates to the sales system 102 via the network 140.

At block 310, the sales system 102 adjusts the exchange rate based on a predetermined fee. In this example, a currency exchange fee is assessed for any currency conversion. In one embodiment, the administrator of the sales system 102 can pass on the cost of the currency exchange fee to the end user by adjusting the exchange rate applied to the foreign currency conversions. In the illustrated embodiment, the exchange rates received from the servers $150_{1-N}$ are adjusted to include the cost of the currency exchange fee, but this is not a requirement.

At block 312, the sales system 102 displays the adjusted exchange rate. As shown in FIG. 2B, the GUI can show the adjusted exchange rates 232 on the display 106 next to corresponding foreign currencies in the list of selected foreign currencies 230.

At block 314, the sales system 102 receives confirmation from the end user to use the adjusted exchange rate. Each adjusted exchange rate 232 shown on the display 106 can be selected or deselected to accept or reject use of the pertinent adjusted exchange rate, respectively. Use of the adjusted exchange rates that remain selected can be confirmed via the confirmation button 234. Upon rejecting an adjusted exchange rate, the sales system 102 can prompt the end user to input additional funds into the money flow system 110, if the foreign currencies with accepted adjusted exchange rates are insufficient to complete the transaction.

At block 316, the sales system 102 receives a foreign currency amount via a money flow system. After confirming use of the selected adjusted exchange rates, the end user can input the foreign currencies into the money flow system 110.

At block 318, the sales system 102 converts the foreign currency amount to a local currency amount using the adjusted exchange rate. At block 320, the sales system 102 returns a difference between the local currency amount and a cost.

After converting the foreign currencies to the local currency, the costs of the items in the transaction are updated to reflect the cost of the conversion. The end user can also input local currency into the money flow system 110 to supplement the value of the converted currencies, or the end user can provide other payments means such as a gift card to pay the remaining balance.

In one embodiment, local currency can be input into the money flow system 110 before or after inputting the foreign currency into the money flow system 110. Further, the local currency can be entered into the money flow system before or after selecting the foreign currency payment option, or any other payment option.

As previously explained, the sales system 102 can subtract the costs of the items in the transaction (which are denominated in the local currency) from the value of the converted currencies and any inputted local currency or other payment means. When necessary, the sales system 102 can notify the end user of insufficient funds to complete the transaction via the display 106 or an audible announcement. When there are sufficient funds, the transaction is completed, and any change due can be returned to the end user via the money flow system 110 or a coin dispenser 108. The method ends at block 322.

Figure 4:
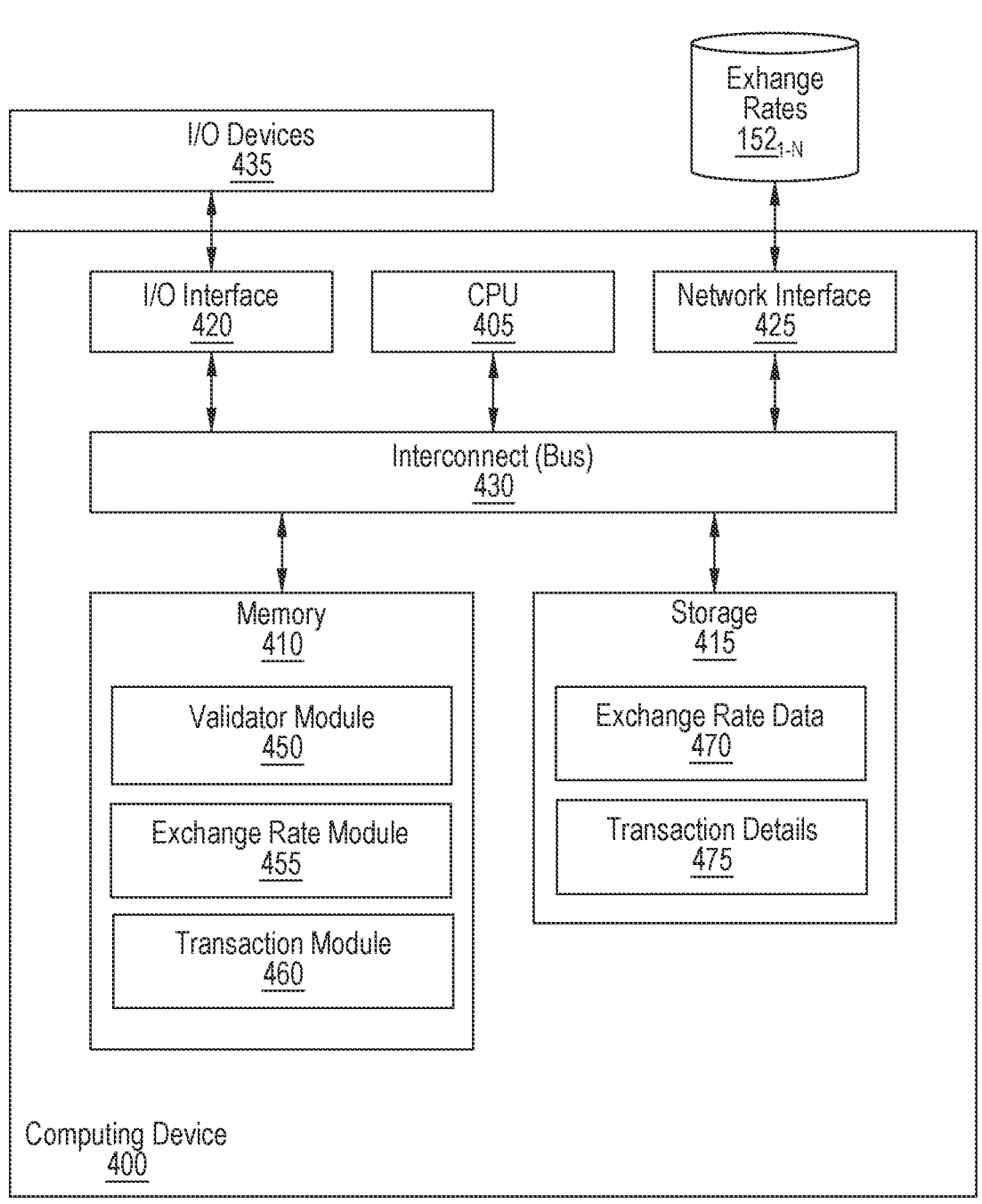
FIG. 4 illustrates a computing device of a sale system, according to one embodiment.

FIG. 4 illustrates an example computing device 400 of a sales system 102, according to one embodiment. The computing device 400 is configured to perform various aspects of the present disclosure. Although depicted as a physical device, in some embodiments, the computing device 400 may be implemented using virtual device(s), and/or across a number of devices (e.g., in a cloud environment).

As illustrated, the computing device 400 includes a CPU 405, memory 410, storage 415, a network interface 425, and one or more I/O interfaces 420. In the illustrated embodiment, the CPU 405 retrieves and executes programming instructions stored in memory 410, as well as stores and retrieves application data residing in storage 415. The CPU 405 is generally representative of a single CPU and/or GPU, multiple CPUs and/or GPUs, a single CPU and/or GPU having multiple processing cores, and the like. The memory 410 is generally included to be representative of a random access memory. Storage 415 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 435 (such as keyboards, monitors, etc.) are connected via the I/O interface(s) 420. Further, via the network interface 425, the computing device 400 can be communicatively coupled with the servers 150$_{1-N}$, or one or more other devices and components (e.g., via the network 140, which may include the Internet, local network(s), and the like). As illustrated, the CPU 405, memory 410, storage 415, network interface(s) 425, and I/O interface(s) 420 are communicatively coupled by one or more buses 430.

In the illustrated embodiment, the memory 410 includes a validator module 450, an exchange rate module 455, and a transaction module 460, which when executed by the processor may perform one or more embodiments discussed above. Although depicted as discrete components for conceptual clarity, in embodiments, the operations of the depicted components (and others not illustrated) may be combined or distributed across any number of components. Further, although depicted as software residing in memory 410, in embodiments, the operations of the depicted components (and others not illustrated) may be implemented using hardware, software, or a combination of hardware and software.

In one embodiment, the validator module 450 is used to determine whether a currency input into the money flow system 110 is deemed acceptable by the sales system 102. As discussed above, the money flow system 110 scans any inputted currency to determine whether the currency is authentic. In one embodiment, this result is signaled to the validator module 450 via the I/O interface 420. Upon determining that the currency is authentic, the validator module 450 can proceed with the transaction. However, upon determining that the currency is inauthentic, the validator module 450 can request that the money flow system return the currency to the end user.

Further, the validator module 450 is generally configured by an administrator of the sales system 102 to accept or reject select foreign currencies. The validator module 450 can determine whether a currency input into the money flow system 110 is a currency accepted by the sales system 102. Upon determining that the currency is acceptable, the validator module 450 can proceed with the transaction. However, upon determining that the currency is not acceptable, the validator module 450 can request that the money flow system return the currency to the end user.

In one embodiment, the exchange rate module 455 is used to retrieve and adjust exchange rates, as discussed above. The sales system 102 can request pertinent exchange rates for foreign currencies input into the money flow system 110 by the end user. The exchange rate module 455 may generally be used to request real-time exchange rates 152$_{1-N}$ from databases of servers 150$_{1-N}$ via the network 140. Upon receiving the pertinent exchange rates, the exchange rate module 455 can adjust these exchange rates using a predetermined fee, and provide them to the display 106 via I/O interface 420 for the end user to accept or reject.

In one embodiment, the transaction module 460 is used to perform calculations for costs, discounts, payments, taxes, and the like, to complete the transaction, as discussed above. The transaction module 460 can determine the total amount due to complete the transaction. Further, upon receiving confirmation from the end user to accept the adjusted exchange rates, the transaction module 460 can update the total amount due to reflect any changes, and proceed with completing the transaction. Alternatively, upon failure of the end user to accept adjusted exchange rates, the transaction module 460 can issue a request to the I/O devices 435, for the end user to input additional funds into the money flow system 110, if the value of the foreign currencies whose adjusted exchange rates were accepted are insufficient to complete the transaction.

In the illustrated example, the storage 415 includes exchange rate data 470 and transaction details data 475. The exchange rate data 470 can include data regarding the real-time exchange rates 152$_{1-N}$ retrieved from the servers 150$_{1-N}$, as well as data regarding the adjusted exchange rates, and the predetermined fee. The transaction details data 475 can include data about the transaction such as the quantity of items for purchase, item descriptions, prices, costs, taxes, and the like. Although depicted as residing in storage 415, the exchange rate data 470 and transaction details data 475 may be stored in any suitable location, including memory 410.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements discussed above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages herein are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method performable by a point-of-sale device comprising:

determining a cost of an item for purchase in a transaction for processing via a point-of-sale system in a self-checkout lane, wherein the cost is output for display;

generating for display a foreign currency payment option;

upon receiving a selection of the foreign currency payment option, tracking, by operation of one or more computer processors, a plurality of currency amounts for acceptance as payment for the transaction, the plurality of currency amounts being of a first foreign currency and at least one supplementing currency selected from a second foreign currency and a local currency, wherein the tracking comprises:

receiving a selection of the first foreign currency;

retrieving, via a network interface, a first exchange rate corresponding to the first foreign currency;

receiving, via a money flow system of the point of sale device, a first foreign currency amount comprising at least one of notes or coins;

scanning, via the money flow system, the at least one of notes or coins;

determining, via a validator module of the point of sale device, a foreign governing entity associated with the at least one of notes or coins, and that the at least one of notes or coins is authentic based, at least in part, on the scanning;

determining, via the validator module of the point of sale device, the at least one of notes or coins does not match the foreign governing entity and is inauthentic based, at least in part, on the scanning, in response to determining the at least one of notes or coins is authentic, converting in real time the first foreign currency amount to a first local currency amount based on the first exchange rate;

in response to determining that the at least one of notes or coins is inauthentic and does not match the foreign governing entity, extracting, via a bill transfer module of the point of sale device, the at least one of notes or coins; and determining a difference amount between the first local currency amount and the cost of the item, wherein the difference amount is output for display; and completing the transaction via the point-of-sale system, including accepting the tracked plurality of currency amounts as payment for the transaction.

2. The computer-implemented method of claim 1, the tracking further comprising:

receiving a selection of a second foreign currency;

retrieving, via the network interface, a second exchange rate corresponding to the second foreign currency;

adjusting the second exchange rate based on a predetermined fee;

receiving a second foreign currency amount;

converting in real time the second foreign currency amount to a second local currency amount using the adjusted second exchange rate; and determining a difference amount between a total local currency amount and the cost of the item, wherein the total local currency amount includes the first local currency amount and the second local currency amount, wherein the difference amount between the total local currency amount and the cost of the item is output for display.

3. The computer-implemented method of claim 2, the tracking further comprising:

generating for display a prompt or notification to indicate that the total currency amount is insufficient to cover the cost of the item;

receiving a third local currency amount to supplement the total currency amount; and determining an updated difference amount between an updated total local currency amount and the cost of the item, wherein the updated total local currency amount includes the first local currency amount, the second local currency amount, and the third currency amount, wherein the updated difference amount is output for display;

wherein the first and second local currency amounts are available for acceptance without requiring any physical submission of the first and second local currency amounts, wherein the tracking provides a single transaction point for aggregating multiple foreign currencies and the local currency to complete the transaction, even when any individual currency is insufficient in value to complete the transaction.

4. The computer-implemented method of claim 1, wherein the money flow system comprises a bank note recycler or a bulk coin recycler.

5. The computer-implemented method of claim 1, the tracking further comprising:

adjusting the first exchange rate based on the predetermined fee, wherein the predetermined fee is based on a currency exchange fee.

6. The computer-implemented method of claim 1, the tracking further comprising:

upon determining that the difference amount is a positive amount, outputting, via the money flow system or a coin dispenser, the difference amount denominated in the local currency.

7. A point-of-sale device, comprising:

a display;

a money flow system;

a network interface;

a validator module;

a bill transfer module;

a processor; and memory comprising an algorithm or computer instruction, which when executed by the processor, performs an operation, the operation comprising:

determining a cost of an item for purchase in a transaction, wherein the cost is output for display, the transaction comprising a self-checkout transaction;

generating for display a foreign currency payment option;

upon receiving a selection of the foreign currency payment option, tracking a plurality of currency amounts for acceptance as payment for the transaction, the plurality of currency amounts being of a first foreign currency and at least one supplementing currency selected from a second foreign currency and a local currency, wherein the tracking comprises:

receiving a selection of the first foreign currency;

retrieving, via the network interface, a first exchange rate corresponding to the first foreign currency;

receiving, via the money flow system, a first foreign currency amount comprising at least one of notes or coins;

scanning, via the money flow system, the at least one of notes or coins;

determining, via the validator module of the point of sale device, a foreign governing entity associated with the at least one of notes or coins and that the at least one of notes or coins is authentic based, at least in part, on the scanning;

determining, via the validator module of the point of sale device, that the at least one of notes or coins does not match the foreign governing entity and is inauthentic based, at least in part, on the scanning;

in response to determining the at least one of notes or coins is authentic, converting in real time the first foreign currency amount to a first local currency amount based on the first exchange rate;

in response to determining that the at least one of notes or coins is inauthentic and does not match the foreign governing entity, extracting, via a bill transfer module of the point of sale device, the at least one of notes or coins;

and determining a difference amount between the first local currency amount and the cost of the item, wherein the difference amount is output for display; and completing the transaction via the point-of-sale system, including accepting the tracked plurality of currency amounts as payment for the transaction.

8. The point-of-sale device of claim 7, the tracking further comprising:

receiving a selection of a second foreign currency;

retrieving, via the network interface, a second exchange rate corresponding to the second foreign currency;

adjusting the second exchange rate based on a predetermined fee;

receiving, via the money flow system, a second foreign currency amount;

converting in real time the second foreign currency amount to a second local currency amount using the adjusted second exchange rate; and determining a difference amount between a total local currency amount and the cost of the item, wherein the total local currency amount includes the first local currency amount and the second local currency amount, wherein the difference amount between the total local currency amount and the cost of the item is output for display.

9. The point-of-sale device of claim 8, the tracking further comprising:

generating for display a prompt to indicate that the total currency amount is insufficient to cover the cost of the item;

receiving, via the money flow system, a third local currency amount to supplement the total currency amount; and determining an updated difference amount between an updated total local currency amount and the cost of the item, wherein the updated total local currency amount includes the first local currency amount, the second local currency amount, and the third local currency amount, wherein the updated difference amount is output for display.

10. The point-of-sale device of claim 7, wherein the money flow system comprises a bank note recycler or a bulk coin recycler.

11. The point-of-sale device of claim 7, the tracking further comprising:

adjusting the first exchange rate based on the predetermined fee, wherein the predetermined fee is based on a currency exchange fee.

12. The point-of-sale device of claim 7, the tracking further comprising:

upon determining that the difference amount is a positive amount, outputting, via the money flow system or a coin dispenser, the difference amount denominated in the local currency.

13. The point-of-sale device of claim 7, wherein the foreign currency is stored in a cash box module or a coin box module upon completion of the transaction.

14. A computer-readable storage medium having computer-readable program code embodied therewith, the computer-readable program code being of a program, the computer-readable program code executable to perform an operation comprising:

determining a cost of an item for purchase in a transaction for processing via a point-of-sale system in a self-checkout lane, wherein the cost is output for display;

generating for display a foreign currency payment option;

upon receiving a selection of the foreign currency payment option, tracking, by operation of one or more computer processors when executing the program, a plurality of currency amounts for acceptance as payment for the transaction, the plurality of currency amounts being of a first foreign currency and at least one supplementing currency selected from a second foreign currency and a local currency, wherein the tracking comprises:

receiving a selection of the first foreign currency;

retrieving, via a network interface, a first exchange rate corresponding to the first foreign currency;

receiving, via a money flow system of the point-of-sale system, a first foreign currency amount;

scanning, via the money flow system, the at least one of notes or coins;

determining, via the validator module of the point of sale device, a foreign governing entity associated with the at least one of notes or coins and that the at least one of notes or coins is authentic based, at least in part, on the scanning;

determining, via the validator module of the point of sale device, that the at least one of notes or coins does not match the foreign governing entity and is inauthentic based, at least in part, on the scanning;

in response to determining the at least one of notes or coins is authentic, converting in real time the first foreign currency amount to a first local currency amount based on the first exchange rate;

in response to determining that the at least one of notes or coins is inauthentic and does not match the foreign governing entity, extracting, via a bill transfer module of the point of sale device, the at least one of notes or coins.

15. The computer-readable storage medium of claim 14, the tracking further comprising:

receiving a selection of a second foreign currency;

retrieving a second exchange rate corresponding to the second foreign currency;

adjusting the second exchange rate based on a predetermined fee;

receiving, via the money flow system, a second foreign currency amount;

converting in real time the second foreign currency amount to a second local currency amount using the adjusted second exchange rate; and determining a difference amount between a total local currency amount and the cost of the item, wherein the total local currency amount includes the first local currency amount and the second local currency amount, wherein the difference amount between the total local currency amount and the cost of the item is output for display.

16. The computer-readable storage medium of claim 15, the tracking further comprising:

generating for display a prompt to indicate that the total currency amount is insufficient to cover the cost of the item;

receiving, via the money flow system, a third local currency amount to supplement the total currency amount; and determining an updated difference amount between an updated total local currency amount and the cost of the item, wherein the updated total local currency amount includes the first local currency amount, the second local currency amount, and the third local currency amount, wherein the updated difference amount is output for display.

17. The computer-readable storage medium of claim 14, the tracking further comprising:

adjusting the first exchange rate based on the predetermined fee, wherein the predetermined fee is based on a currency exchange fee.

18. The computer-readable storage medium of claim 14, wherein the money flow system comprises a bank note recycler or a bulk coin recycler.

19. The computer-readable storage medium of claim 14, the tracking further comprising:

upon determining that the difference amount is a positive amount, requesting the money flow system or a coin dispenser to output the difference amount in the local currency.

* * * * *